US011480221B2

(12) United States Patent
Klemen

(10) Patent No.: US 11,480,221 B2
(45) Date of Patent: Oct. 25, 2022

(54) SYNCHRONIZED ELECTROMAGNETIC SINGLE PLATE CLUTCH SYSTEM

(71) Applicant: Rolls-Royce Corporation, Indianapolis, IN (US)

(72) Inventor: Donald Klemen, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 17/449,370

(22) Filed: Sep. 29, 2021

(65) Prior Publication Data

US 2022/0018401 A1 Jan. 20, 2022

Related U.S. Application Data

(62) Division of application No. 16/813,242, filed on Mar. 9, 2020, now Pat. No. 11,137,035.

(51) Int. Cl.
*F16D 27/112* (2006.01)
*F16D 27/06* (2006.01)
*F16D 27/115* (2006.01)
*F16D 27/00* (2006.01)

(52) U.S. Cl.
CPC ............ *F16D 27/112* (2013.01); *F16D 27/06* (2013.01); *F16D 27/115* (2013.01); *F16D 2027/002* (2013.01); *F16D 2027/007* (2013.01); *F16D 2027/008* (2013.01)

(58) Field of Classification Search
CPC .... F16D 27/115; F16D 27/112; F16D 27/108; F16D 27/10; F16D 27/02; F16D 27/04; F16D 27/06; F16D 27/08; F16D 2027/002; F16D 2027/007; F16D 2027/008
See application file for complete search history.

(56) References Cited

U.S. PATENT DOCUMENTS

| 2,579,318 A | 12/1951 | Hershberger |
| 2,796,963 A | 6/1957 | Harter |
| 3,016,667 A | 1/1962 | Yves |
| 3,713,519 A | 1/1973 | Ruget |
| 4,030,583 A | 6/1977 | Miller |

(Continued)

FOREIGN PATENT DOCUMENTS

| CN | 103032541 A | 4/2013 |
| CN | 103042942 A | 4/2013 |

(Continued)

OTHER PUBLICATIONS

Prosecution History from U.S. Appl. No. 16/813,242 dated Mar. 17, 2021 through Sep. 10, 2021, 20 pgs.

*Primary Examiner* — Timothy Hannon
(74) *Attorney, Agent, or Firm* — Shumaker & Sieffert, P.A.

(57) ABSTRACT

An electromagnetic clutch assembly may include a first clutch plate, a second clutch plate, and a synchronizer. The second clutch plate may define an aperture. A portion of the synchronizer may be configured to extend through the aperture. In the absence of a magnetic field, the first clutch plate and the first surface of the second clutch plate may define an air gap and the portion of the synchronizer may extend into the air gap. In response to a first magnetic field, the portion of the synchronizer may contact the first clutch plate. In response to a second magnetic field, the portion of the synchronizer may translate in the aperture toward the second clutch plate and the first clutch plate and the second clutch plate may close the air gap.

18 Claims, 6 Drawing Sheets

(56) References Cited

U.S. PATENT DOCUMENTS

| | | |
|---|---|---|
| 4,545,676 A | 10/1985 | Kato |
| 4,561,520 A | 12/1985 | Fogelberg |
| 4,733,577 A | 3/1988 | Griesser et al. |
| 4,891,619 A | 1/1990 | Booth et al. |
| 5,052,534 A | 10/1991 | Gustin et al. |
| 5,320,206 A | 6/1994 | Maejima |
| 5,465,819 A | 11/1995 | Weilant et al. |
| 5,737,900 A | 4/1998 | Konstantin et al. |
| 5,915,513 A | 6/1999 | Isley, Jr. et al. |
| 6,127,754 A | 10/2000 | Kolomeitsev et al. |
| 6,878,088 B2 | 4/2005 | Williams |
| 7,520,373 B2 | 4/2009 | Hill et al. |
| 7,681,704 B2 | 3/2010 | Schenkel, III et al. |
| 2004/0180747 A1 | 9/2004 | Weilant et al. |
| 2010/0259121 A1 | 10/2010 | Ueda et al. |
| 2018/0291968 A1 | 10/2018 | Sarnie et al. |
| 2021/0277961 A1 | 9/2021 | Klemen |

FOREIGN PATENT DOCUMENTS

| | | |
|---|---|---|
| CN | 108506365 A | 9/2018 |
| DE | 19532163 A1 | 3/1997 |
| DE | 19532164 A1 | 3/1997 |
| EP | 0763498 A1 | 3/1997 |
| EP | 0846065 A1 | 6/1998 |
| EP | 1847494 A2 | 6/1998 |
| EP | 0844937 B1 | 1/2000 |
| EP | 1640629 A1 | 3/2006 |
| EP | 1731796 A2 | 12/2006 |
| EP | 3330560 A1 | 6/2018 |
| FR | 2112864 A5 | 6/1972 |
| GB | 842395 A | 7/1960 |
| JP | H07269603 A | 10/1995 |
| WO | 9116552 | 10/1991 |

SYNCHRONIZED ELECTROMAGNETIC SINGLE PLATE CLUTCH SYSTEM

This application is a divisional of U.S. application Ser. No. 16/813,242, filed Mar. 9, 2020, which is incorporated herein by reference in its entirety.

TECHNICAL FIELD

The disclosure relates to electromagnetic clutch systems, such as synchronized electromagnetic single plate clutch systems.

BACKGROUND

Gas turbine engines include various accessory components to enable the engine to operate, such as, for example, fuel pumps, oil pumps, electric generators and/or motors. Often, accessory components are driven by a turbine through an accessory gearbox. In some implementations, accessory components are rotationally coupled to the accessory gearbox using a mechanical clutch, which allows selective disconnection of the accessory components from the gearbox and turbine when the accessory components are not needed.

SUMMARY

The disclosure describes assemblies, systems, and techniques that include an electromagnetic clutch with a synchronizer. In some examples, the electromagnetic clutch may replace a shear-limited shaft for coupling driven components to a turbine engine (e.g., through an accessory gearbox). The electromagnetic clutch may provide improvements over clutch assemblies, systems, or techniques without the described synchronizer. For example, the synchronizer may be configured to reduce wear of the faces of the first clutch plate, the second clutch plate, or both. Additionally, debris from the shearing of a shear-limited shaft is eliminated because no shearing is needed to protect the engine by isolating the faulty component.

In some examples, the disclosure describes an electromagnetic clutch assembly that may include a first clutch plate, a second clutch plate, and a synchronizer. The first clutch plate and the second clutch plate may be configured to rotate about a clutch axis. The second clutch plate may include a first surface facing the first clutch plate and a second surface facing away from the first clutch plate. The second clutch plate may define an aperture extending from the first surface to the second surface. At least a portion of the synchronizer may be configured to extend from the second surface of the second clutch plate through the aperture. In the absence of a magnetic field, the first clutch plate and the first surface of the second clutch plate may define an air gap and the synchronizer may extend through the aperture from the second surface of the second clutch into the air gap. In response to a first magnetic field, a surface of the synchronizer may be configured to contact the first clutch plate and the first surface of the second clutch plate may be configured to define the air gap. In response to a second magnetic field, the synchronizer may be configured to translate in the aperture toward the second surface of the second clutch plate and the first clutch plate and the first surface of the second clutch plate may be configured to close the air gap.

In some examples, the disclosure describes a system that may include a first clutch plate, a second clutch plate, a synchronizer, a spring, an electromagnet, and processing circuitry. The first clutch plate and the second clutch plate may be configured to rotate about a clutch axis. The second clutch plate may include a first surface facing the first clutch plate and a second surface facing away from the first clutch plate. The second clutch plate may define an aperture extending from the first surface to the second surface. At least a portion of the synchronizer may be configured to extend from the second surface of the second clutch plate through the aperture. The spring may be configured to exert a spring force on the synchronizer in a direction toward the first clutch plate. The spring also may be configured to compress in response to the synchronizer translating in the aperture in the direction away from the first clutch plate. The electromagnet may be configured to generate a first magnetic field as a first magnetic flux passing through the first clutch plate and the second clutch plate. A first magnetic force of the first magnetic field may be less than a spring force of the spring to close the air gap. The electromagnet also may be configured to generate a second magnetic field as a second magnetic flux passing through the first clutch plate and the second clutch plate. A second magnetic force of the second magnetic field may be greater than a spring force of the spring to close the air gap. The processing circuitry may be configured to control a magnetic field generated by the electromagnet.

In some examples, the disclosure describes a method that may include rotating a first clutch plate around a clutch axis. The method also may include controlling an electromagnet to generate a first magnetic field to cause a synchronizer extending from a second surface of a second clutch plate facing away from the first clutch plate toward a first surface of a second clutch plate facing the first clutch plate through an aperture of defined by second clutch plate to contact the first clutch plate and generate a torque on the synchronizer. The first clutch plate and the second clutch plate may define an air gap. The method also may include controlling the electromagnet to generate a second magnetic field to cause the first surface of the second clutch plate to contact the first clutch plate.

The details of one or more examples are set forth in the accompanying drawings and the description below. Other features, objects, and advantages will be apparent from the description and drawings, and from the claims.

DETAILED DESCRIPTION

Figure 1:
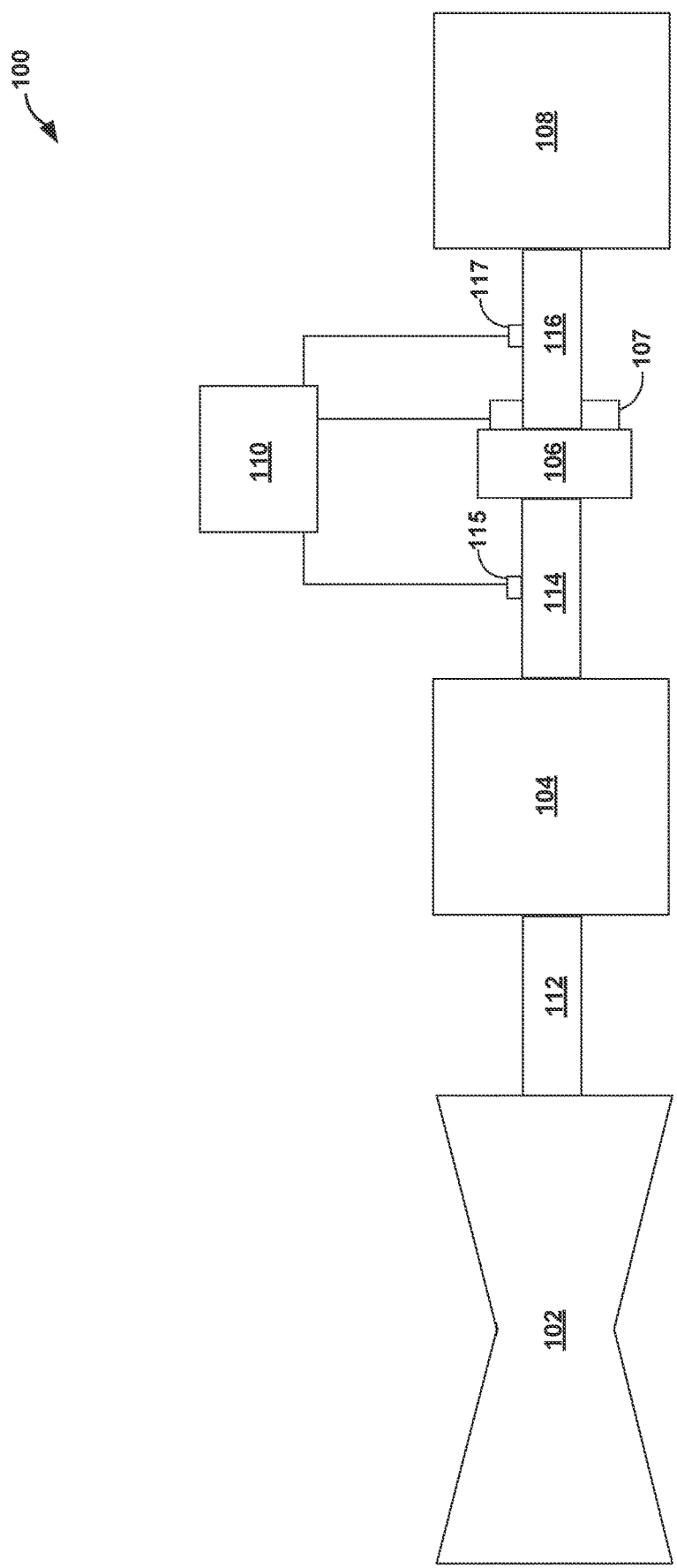
FIG. 1 is a conceptual diagram illustrating an example system including an electromagnetic clutch assembly having a synchronizer.

The disclosure generally describes assemblies, systems, and techniques that include an electromagnetic clutch having a synchronizer. An example electromagnetic clutch assembly may include a first clutch plate, a second clutch plate, and a synchronizer. The synchronizer may be configured to extend through one or more apertures defined in the second clutch plate. In the absence of a magnetic field, the first clutch plate and the second clutch plate may define an air gap and the synchronizer may extend through the aperture into the air gap without contacting the first clutch plate. In response to a first magnetic field applied to the first and second clutch plates to cause the first clutch plate and/or second clutch plate to move to reduce the air gap, the synchronizer may be configured to contact the first clutch plate, while the first clutch plate and the second clutch plate maintain a reduced air gap. In response to a second (greater) magnetic field, the synchronizer may be configured to translate in the aperture as the air gap is closed and the first clutch plate engages the second clutch plate.

Electromagnetic clutch assemblies may be used to control engagement of system accessories, such as aircraft accessories of gas turbine engine systems. For example, restarting accessories shutdown during operation of a turbine engine may require a friction engagement to restart the accessory. During operation, engagement of an idle accessory may result in undesirable wear of clutch faces that mechanically couple the accessory to the turbine engine.

The described electromagnetic clutch assemblies, systems, and techniques include a synchronizer configured to reduce wear of the clutch faces. In some examples, the synchronizer may include a less abrasive material, relative to the clutch faces. The synchronizer may be configured to re-synchronize the accessory prior to engagement of the clutch faces. For example, a spring coupled to the synchronizer may enable engagement of the synchronizer with a first clutch plate.

In use, an electromagnet may be used to apply a first magnetic field to the first clutch plate and a second clutch plate to begin closing an air gap between the first clutch plate and a second clutch plate by causing one or both of the first or second clutch plates to move. The synchronizer may protrude through the second clutch plate into the air gap. In response to the first magnetic field, the synchronizer may engage the first clutch plate. Friction between the synchronizer and the first clutch plate may transfer a torque from the rotating first clutch plate to the synchronizer. The synchronizer may be mechanically coupled to the second clutch plate, such that the synchronizer transfers the torque to the second clutch plate to begin rotation of the second clutch plate.

Once a rotation of the first clutch plate and the second clutch plate is substantially synchronized, e.g., a first rotational speed of the first clutch plate and a second rotational speed the second clutch plate are the same or within a predetermined threshold amount, the electromagnet may apply a second magnetic field to the first clutch plate and the second clutch plate to fully close the air gap between the first clutch plate and the second clutch plate. For example, the second magnetic field may be configured to generate a magnetic force sufficient to overcome a spring force of the spring coupled to the synchronizer. In some examples, a current applied to the electromagnet may be controlled, based on a rotational speed of the first clutch plate, the second clutch plate, or both. In this way, total wear and/or non-uniform wear of the faces of the first clutch plate, the second clutch plate, or both may be reduced. Additionally, or alternatively, the described clutch assemblies, systems, and techniques may provide smoother engagement of the first clutch plate and the second clutch plate. Smoother engagement may reduce vibration caused by engagement of the first clutch plate and the second clutch plate, compared to other clutch systems. Additionally, or alternatively, the synchronizer may include a replaceable wear component, reducing maintenance costs of a clutch system. In examples in which the synchronizer includes a non-magnetic material, the non-magnetic material may reduce attraction of wear material, e.g., metals, to the electromagnet, thereby reducing wear or decreased function cause by debris build-up on the electromagnet.

FIG. 1 is a conceptual diagram illustrating an example system 100 including an electromagnetic clutch assembly 106. System 100 may include, for example, an engine 102, an accessory gear box 104, an electromagnetic clutch assembly 106, an accessory component 108 (accessory 108), and a controller 110. System 100 may include any suitable mechanical system. In some examples, system 100 may include at least a portion of a mechanical system of a vehicle powered by an internal combustion engine. In some examples, system 100 may include at least a portion of a mechanical system of an aircraft powered by a gas turbine engine.

Engine 102 is mechanically coupled to accessory gear box 104 via drive shaft 112. Engine 102 is configured to rotate (e.g., drive) drive shaft 112. Although illustrated as a gas turbine engine, in other example, engine 102 may include other devices configured to output shaft work, such as internal combustion engines, fuel cells, electric motors or generators, pneumatic motors, or hydraulic motors.

Drive shaft 112 may include any suitable shaft and/or gear system to transfer shaft work from engine 102 to accessory gear box 104. In examples in which engine 102 includes a gas turbine engine, drive shaft 112 may include an internal gearbox including a direct drive, a stub shaft drive, an idler shaft drive, or other mechanical coupling configured to drive a radial drive shaft or a tower shaft. In some examples, drive shaft 112 may include an intermediate gearbox.

Accessory gearbox 104 is configured to transfer shaft work from drive shaft 112 to input shaft 114. In some examples, accessory gearbox 104 may include an accessory drive of a gas turbine engine system. Input shaft 114 is configured to drive one or more accessories of system 100. Although illustrated as a single input shaft 114, system 100 may include two or more input shafts driven by drive shaft 112 via accessory gearbox 104. For example, accessory gearbox 104 may include a plurality of spur gears mechanically coupling drive shaft 112 to respective input shaft of a plurality of input shafts 114, each at a selected gear ratio.

Input shaft 114 is coupled to an output shaft 116 via an electromagnetic clutch assembly 106. For example, input shaft 114 may be coupled to a first clutch plate of electromagnetic clutch assembly 106, and a second clutch plate of electromagnetic clutch assembly 106 may be coupled to output shaft 116. Output shaft 116 is mechanically coupled to accessory 108. Accessory 108 may include, for example, one or more of fuel pumps, generators, constant speed drives, oil pumps, hydraulic pumps, compressors, engine starters, tachometer sensor drives, and auxiliary gearbox drives.

Electromagnetic clutch assembly 106 includes an electromagnet 107 configured to control engagement of electromagnetic clutch assembly 106. For example, electromagnetic clutch assembly 106 may be configured to, in response to a magnetic field generated by electromagnet 107, engage (or disengage) input shaft 114 with (from) output shaft 116. In some examples, electromagnet 107 may include an electromagnetic coil wound around a clutch axis, such as, for example, around at least a portion of output shaft 116 or input shaft 114.

In some examples, system 100 may include at least one of rotational sensors 115 and 117. Rotational sensors 115 and 117 are configured to sense a rotational speed of input shaft 114 (or a first clutch plate coupled to input shaft 114) and output shaft 116 (or a second clutch plate coupled to output shaft 116), respectively. For example, rotational sensors 115 and/or 117 may include one or more of a reflective sensor, an interrupter sensor, an optical encoder, a variable-reluctance sensor, an eddy-current killed oscillator sensor, a Wiegand sensor, a Hall-effect sensor, or other sensors configured to detect a rotational speed of a rotating mechanical component. In some examples, rotational sensors 115 and/or 117 may be configured to determine a rotation of input shaft 114 or output shaft 116, respectively, based on sensing a target disposed on input shaft 114 (of the first clutch plate) or output shaft 116 (or the second clutch plate). In some examples, controller 110 may be configured to receive signals from at least one of rotational sensors 115 or 117 and control, based on a rotational speed determined based on the signal, an electrical current applied to electromagnet 107.

Controller 110 is communicatively coupled to electromagnet 107 and configured to control the magnetic field generated by electromagnet 107. Controller 110 may include, for example, a computing device, a desktop computer, a laptop computer, a workstation, a server, a mainframe, a cloud computing system, a tablet, a smart phone, or the like. Controller 110 is configured to control operation of system 100, including, for example, electromagnet 107. Controller 110 may be communicatively coupled to electromagnet 107, sensors 115 and/or 117, or both using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like. In some examples, controller 110 may include control circuitry, such as one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. For example, controller 110 may include processing circuitry configured to determine an electrical current to apply to electromagnet 107. In some examples, the electrical current may be based on, at least in part, a selected magnetic field, a selected magnetic flux, and/or a selected magnetic force (e.g., between at least two of the first clutch plate, the second clutch plate, or electromagnet 107). In some examples, the electrical current may be based on, at least in part, a rotational speed determined based on one or more signals from rotational sensor 115 and/or 117. In this way, controller 110 may be configured to control the mechanical coupling of engine 102 to accessory 108.

Electromagnetic clutch assembly 106 also includes a first clutch plate, a second clutch plate, and a synchronizer (FIGS. 2A-2D). Each of the first clutch plate and the second clutch plate is configured to rotate around a clutch axis. At least one of the first clutch plate or the second clutch plates is translatable in the axial direction along the clutch axis.

In the absence of a magnetic field, the first clutch plate and the second clutch plate are positioned to define an air gap. The air gap may define a displacement distance between adjacent surfaces, e.g., friction surfaces, of the first clutch plate and the second clutch plate. The synchronizer may extend through an aperture of the second clutch into the air gap. The synchronizer may be translatable in the axial direction and coupled to a spring configured to urge at least a portion of the synchronizer into the air gap.

Electromagnet 107 may be configured to generate a selected magnetic field as a selected magnetic flux passing through at least a portion of electromagnetic clutch assembly 106, e.g., the first clutch plate and the second clutch plate of electromagnetic clutch assembly 106. The selected magnetic field may cause axial movement of the first clutch plate toward the second clutch plate, the second clutch plate toward the first clutch plate, or both. For example, electromagnet 107 may be configured to generate a first magnetic field as a first magnetic flux passing through at least a portion of electromagnetic clutch assembly 106. In response to the first magnetic field, the first clutch plate and/or second clutch plate may move axially such that a surface of the synchronizer contacts the first clutch plate. When exposed to the first magnetic field, the first clutch plate and the second clutch plate may define a reduced air gap. In some examples, a first magnetic force of the first magnetic field may be less in magnitude than a spring force of the spring that biases the synchronizer into the air gap.

Electromagnet 107 also may be configured to generate a second magnetic field as a second magnetic flux passing through the first clutch plate and the second clutch plate. In response to a second magnetic field, the first clutch plate and/or second clutch plate move axially such that the synchronizer translates in the aperture of the second clutch in the axial direction toward the second clutch plate. Further, the first clutch plate and the second clutch plate may close the air gap in response to the second magnetic field. For example, the second magnetic force of the second magnetic field may be greater in magnitude than a spring force of the spring that biases the synchronizer into the air gap such that the spring force is overcome, and the air gap closes.

Figure 2A:
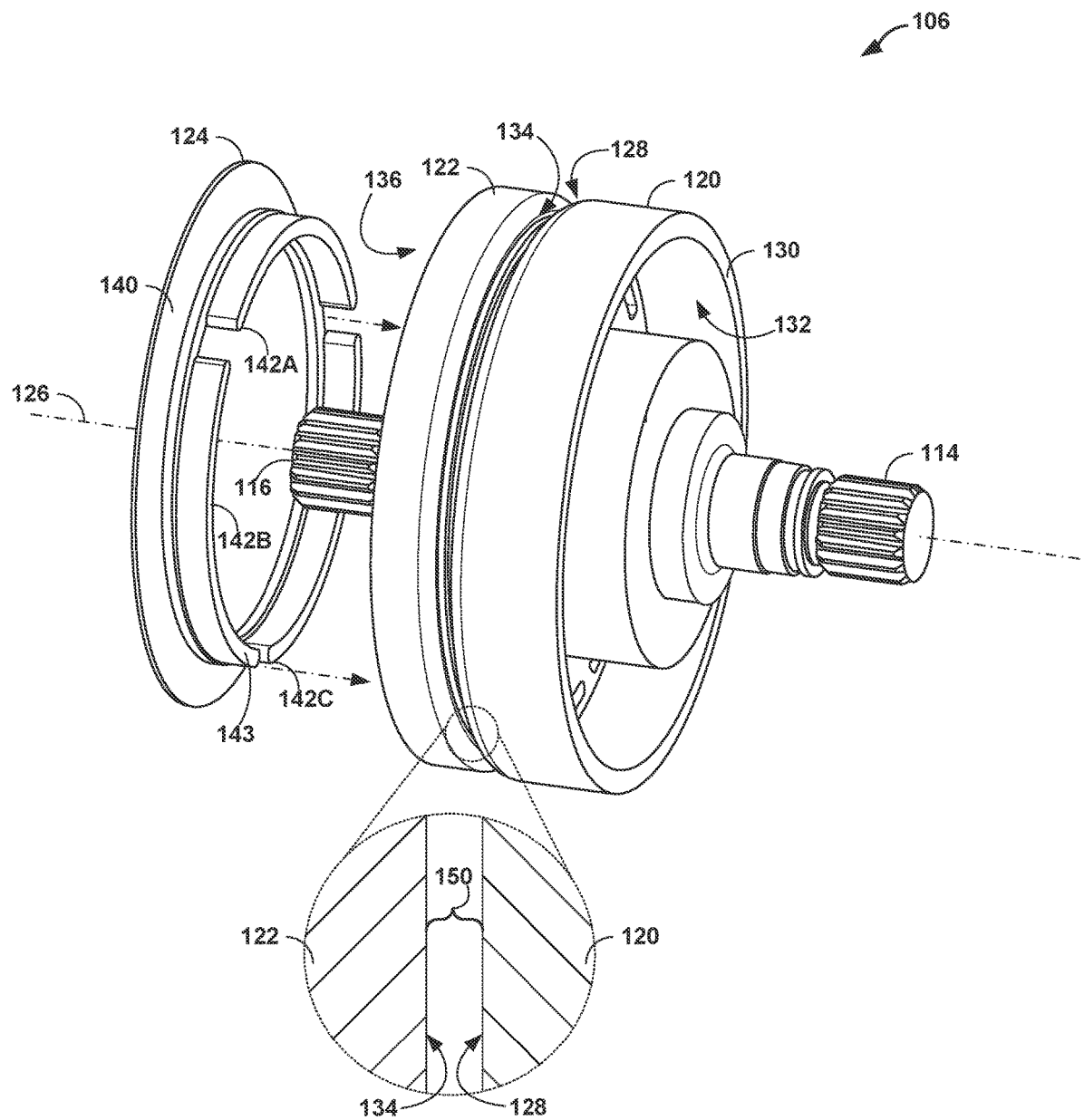
FIGS. 2A-2D are conceptual diagrams illustrating various view of the electromagnetic clutch assembly illustrated in FIG. 1.
Figure 2B:
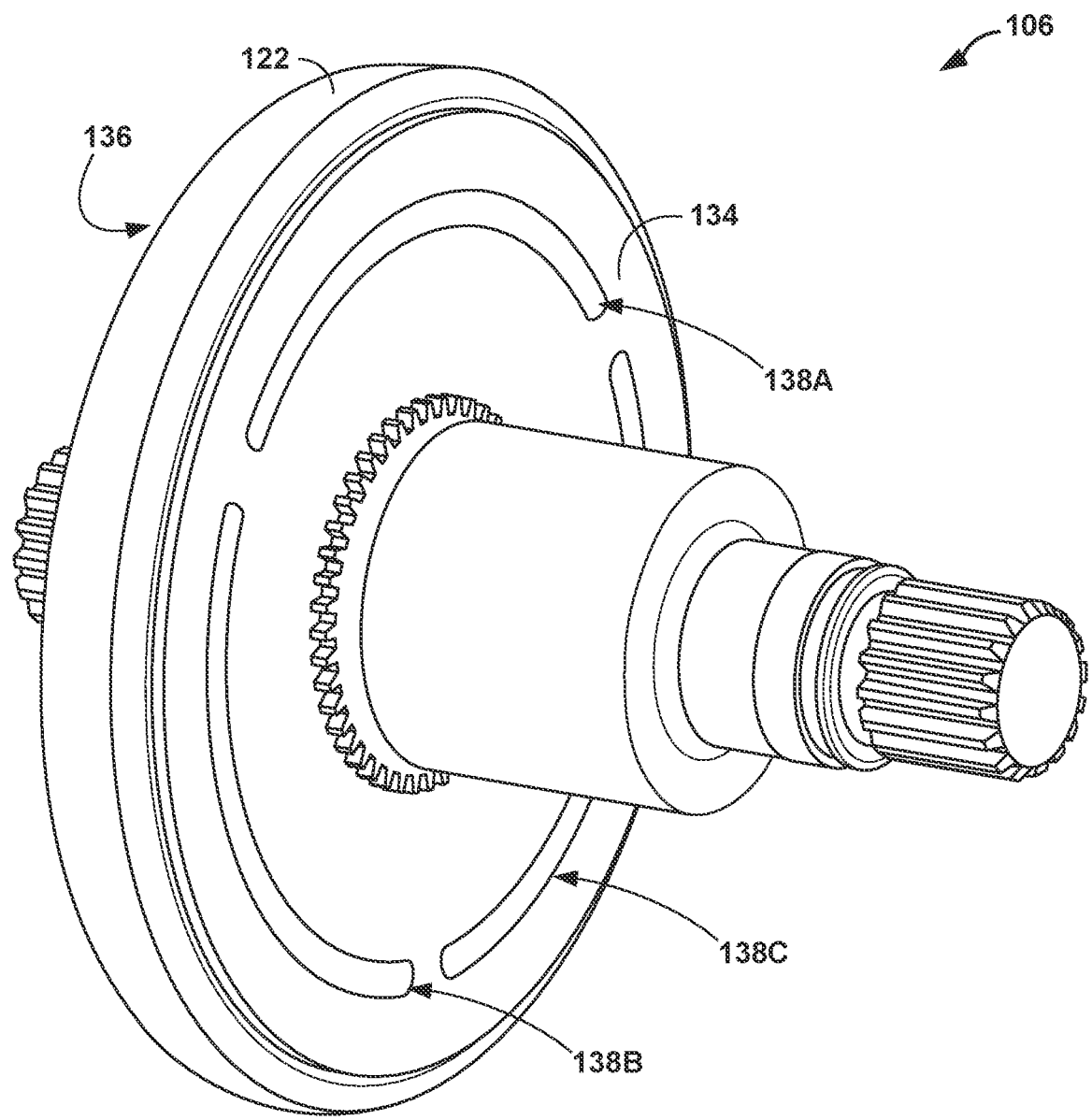
Figure 2C:
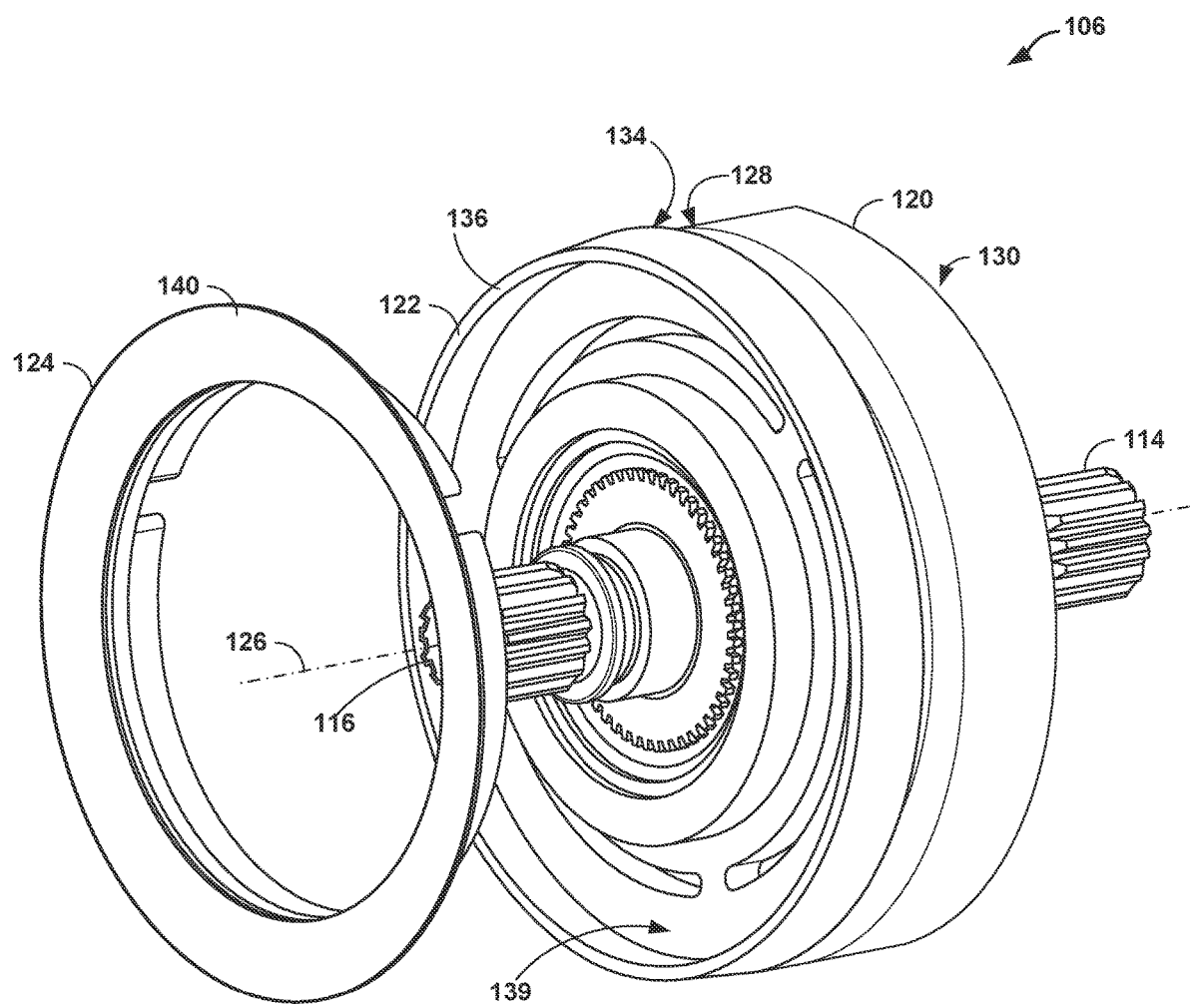

FIGS. 2A-2D are conceptual diagrams illustrating various view of an example electromagnetic clutch assembly 106. As illustrated in FIG. 2A, electromagnetic clutch assembly 106 includes a first clutch plate 120, a second clutch plate 122, and a synchronizer 124. First clutch plate 120 and second clutch plate 122 may be configured to rotate about clutch axis 126. First clutch plate 120 and second clutch plate 122 may include any suitable material or combination of materials for forming a friction surface of a clutch plate. In some examples, first clutch plate 120 and second clutch plate 122 may include a magnetic material, such as, for example, iron-based alloys, nickel-based alloys, cobalt-based alloys, magnetic metals or alloys, of combinations thereof.

First clutch plate 120 includes a first surface 128 and a second surface 130. First surface 128 faces second clutch plate 122. First surface 128 may define a friction surface configured to engage second clutch plate 122. Second surface 130 faces away from second clutch plate 122. In some examples, second surface 130 may define an annular recess 132. Annular recess 132 may be radially offset or spaced from the center of clutch axis 126. In some examples, annular recess 132 may be configured to receive at least a portion of an electromagnet (e.g., electromagnet 107).

Second clutch plate 122 includes a first surface 134 and a second surface 136. First surface 134 faces first clutch plate 120. First surface 134 may define a friction surface configured to engage first clutch plate 120, e.g., first surface 128. Second surface 136 faces away from first clutch plate 120.

Second clutch plate 122 defines a plurality of apertures, e.g., apertures 138A, 138B, and 138C (collectively, apertures 138). Apertures 138 extend from first surface 134 of second clutch plate 122 to second surface 136 of second clutch plate 122.

Figure 2D:
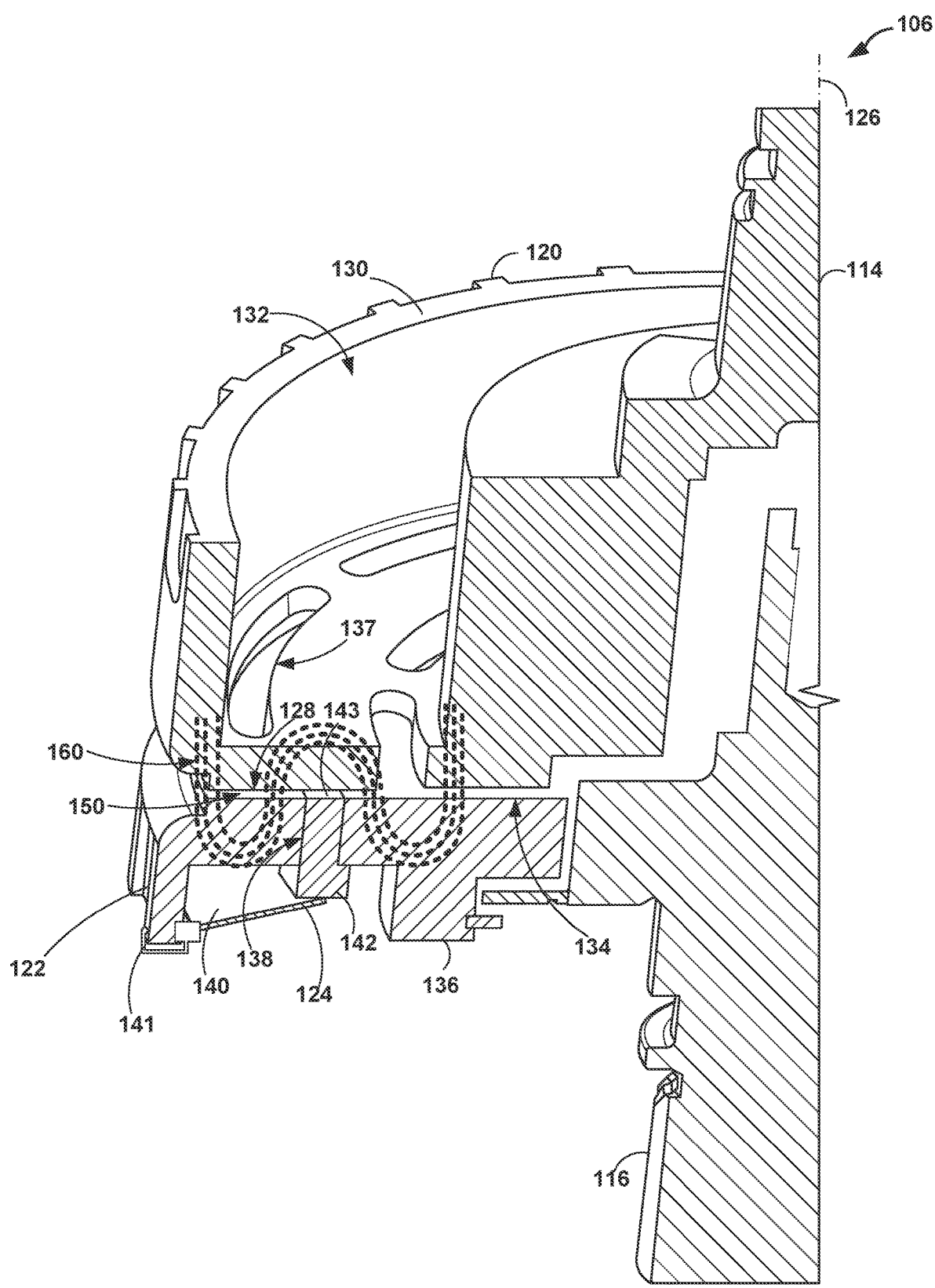

Apertures 138 may include any suitable size and/or shape to receive at least a portion of synchronizer 124 therein. In some examples, a size and/or a shape of apertures 138 may be selected to, in the presence of a magnetic field produced by an electromagnet adjacent first clutch plate 120, control a shape of a magnetic flux of the electromagnet through second clutch plate 122. In some examples, a size and/or a shape of apertures 138 may be selected to, in the presence of a magnetic field produced by an electromagnet adjacent first clutch plate 120, cause a magnetic flux of the electromagnet through second clutch plate 122 to weave through portions of second clutch plate 122 adjacent to apertures 138. For example, as illustrated in FIG. 2D, apertures 137 of first clutch plate 120 and apertures 138 of second clutch plate 122 are disposed relative to each other, size, and shaped to result in magnetic flux 160 weaving through first clutch plate 120 and second clutch plate 122.

Although illustrated as defining three apertures 138, in other examples, second clutch plate 122 may define any suitable number of apertures, such as one aperture, two apertures, or four or more apertures. In some examples, second clutch plate may define a plurality of at least partially concentric apertures (e.g., relative to clutch axis 126). In some examples, the number and relative orientation of apertures 138 may be selected to control a shape of a magnetic flux of the electromagnet through second clutch plate 122.

Synchronizer 124 is configured to extend from second surface 136 of second clutch plate 122 through at least one (and possibly all) of apertures 138. Synchronizer 124 may include any suitable material or combination of materials for forming a friction surface of a clutch plate. In some examples, synchronizer 124 may include a non-magnetic material, such as, for example, copper, aluminum, one or more non-magnetic metal, one or more polymers, one or more ceramics, or combinations thereof. The non-magnetic material may include a material having a relative permeability for magnetic flux of about 1.0. By forming synchronizer 124 from a non-magnetic material, synchronizer 124 may not affect the interaction of a magnetic field with first clutch plate 120 and second clutch plate 122. In this way, synchronizer 124 may not change a magnetic path based on the design of first clutch plate 120 and second clutch plate 122 (e.g., position, size, and shape of apertures 137 and 138 defined in first clutch plate 120 and second clutch plate 122).

In some examples, synchronizer 124 includes an annular member 140 and protrusions 142A, 142B, and 142C (collectively, protrusions 142). Annular member 140 is configured to rotate about clutch axis 126, e.g., rotate together with second clutch plate 122 about clutch axis 126. In some examples, second surface 136 may define an annular recess 139 (FIG. 2C) radially offset from clutch axis 126. Annular recess 139 may be shaped to receive at least a portion of annular member 140. Protrusions 142 extend from annular member 140 substantially parallel to clutch axis 126. At least one respective protrusion of protrusions 142 may extend from second surface 136 of second clutch plate 122 through a respective aperture of apertures 138.

In some examples, synchronizer 124 may include a spring configured to exert a spring force on at least a portion of synchronizer 124 in a direction toward first clutch plate 120. In some examples, the spring may include any suitable type of spring coupled to at least a portion of synchronizer 124 and at least a portion of clutch assembly 106 that is configured to rotate with second clutch plate 122. For example, as illustrated in FIG. 2D, synchronizer 124 may include snap ring 141 configured to apply a spring reaction loading on annular member 140. In some examples, annular member 140 may be a spring configured to urge protrusions 142 through apertures 138 toward first clutch plate 120. For example, at least a portion of annular member 140 may define or include a disc spring. In some examples, the spring of synchronizer 124 may be configured to compress in response to synchronizer 124 translating in apertures 138 in the direction away from first clutch plate 120.

In some examples, synchronizer 124 may include a plurality of discrete synchronizers. Each respective synchronizer of the plurality of discrete synchronizers may include one or more respective protrusions configured to extend through a respective aperture of apertures 138. Each protrusion may be translatable in the axial direction. In some examples, each respective protrusion may be coupled to a respective spring configured to urge the respective protrusions toward first clutch plate 120.

In some examples, a first magnetic force of a first magnetic field generated by the electromagnet (e.g., electromagnet 107) may be less in magnitude than a spring force of the spring of synchronizer 124 required to close air gap 150. The spring force required to close air gap 150 may be proportional to a spring constant of the spring and a length of the air gap, e.g., based on Hook's law. Hence, in response to the first magnetic force, at least one of first clutch plate 120 or second clutch plate 122 may translate in the axial direction to partially close air gap 150. Once first clutch plate 120 (e.g., first surface 128) contacts surface 143 of protrusions 142, the first magnetic force is not sufficient to fully close air gap 150. In response to contact with a rotating first clutch plate 120, friction between first surface 128 of first clutch plate 120 and surface 143 of synchronizer 124 transfers torque from first clutch plate 120 to second clutch plate 122 via synchronizer 124. This allows rotational speed of second clutch plate 122 to synchronize with rotational speed of first clutch plate 120.

In some examples, a second magnetic force of a second magnetic field generated by the electromagnet (e.g., electromagnet 107) may be greater in magnitude than a spring force of the spring of synchronizer 124 required to axially translate protrusions 142 such that surfaces of protrusions 142 are substantially co-planar with first surface 134 and air gap 150 is closed. Hence, in response to the second magnetic force, at least one of first clutch plate 120 or second clutch plate 122 may translate in the axial direction to close air gap 150. Air gap 150 may be closed when first surface 128 of first clutch plate 120 contacts second surface 136 of second clutch plate 122. In response to contact with a rotating first clutch plate 120, friction between first surface 128 of first clutch plate 120 and second surface 136 of second clutch plate 122 transfers torque from first clutch plate 120 to second clutch plate 122.

In some examples, at least one of first clutch plate 120 and second clutch plate 122 may be configured to cause magnetic flux 160 to weave between first clutch plate 120 and second clutch plate 122. In some examples, at least one of apertures 137 in first clutch plate 120 or apertures 138 in second clutch plate 122 may be configured to cause magnetic flux 160 to flux weave between first clutch plate 120 and second clutch plate 122. In examples in which synchronizer 124 includes a non-magnetic material, synchronizer 124 may have a substantially negligible effect on the weaving of magnetic flux 160.

Figure 3:
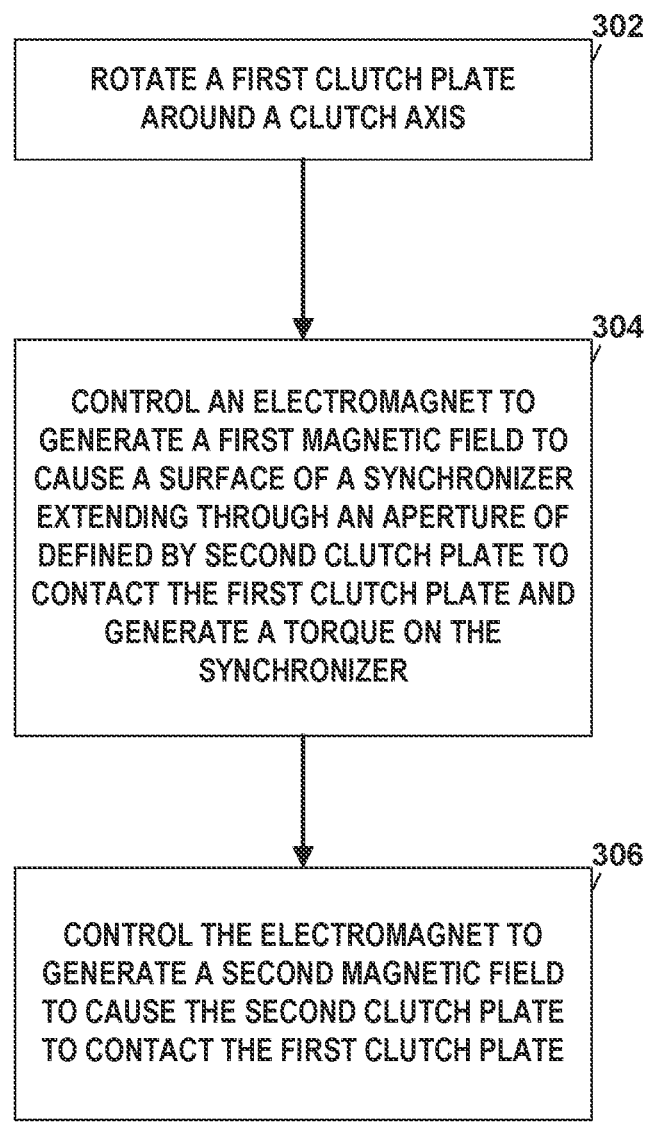
FIG. 3 is a flow diagram illustrating an example technique for controlling engagement of an engine with an accessory using an electromagnetic clutch assembly having a synchronizer.

FIG. 3 is a flow diagram illustrating an example technique for controlling engagement of an engine with an accessory using an electromagnetic clutch assembly having a synchronizer. The technique illustrated in FIG. 3 is described in reference to system 100 and electromagnetic clutch assembly 106 described above. However, the technique may be used to control other systems and clutch assemblies. Additionally, system 100 and electromagnetic clutch assembly 106 may be controlled using other techniques.

The technique illustrated in FIG. 3 may include rotating a first clutch plate around a clutch axis (302). As discussed above, engine 102 may be configured to rotate, e.g., via drive shaft 112, accessory gear box 104, and input shaft 114, first clutch plate 120.

The technique illustrated in FIG. 3 also may include controlling electromagnet 107 to generate a selected magnetic field as a selected magnetic flux passing through at least a portion of electromagnetic clutch assembly 106. For example, controlling electromagnet 107 may include controlling a current applied to electromagnet 107 to generate a first magnetic field as a first magnetic flux passing through at least a portion of electromagnetic clutch assembly 106 (304). In some examples, controlling electromagnet 107 may cause, in response to the first magnetic field, synchronizer 124 to contact first clutch plate 120 to transfer a torque to synchronizer 124. As discussed above, synchronizer 124 may extend from second surface 136 of second clutch plate 122 (e.g., second surface 136 facing away from first clutch plate 120) toward first surface 134 of second clutch plate 122 (e.g., facing first clutch plate 120) through at least one of apertures 138 defined by second clutch plate 122. In some examples, the technique may include controlling the first magnetic field such that first clutch plate 120 and second clutch plate 122 define air gap 150, e.g., during application of the first magnetic field to first clutch plate 120 and second clutch plate 122.

In response to contacting first clutch plate 120, a friction at surface 143 of synchronizer 124 may transfer a force as a torque from first clutch plate 120, through synchronizer 124, to second clutch plate 122. In some examples, transferring the torque from synchronizer 124 to second clutch plate 122 may include sensing a rotation of at least one of input shaft 114 via rotational sensor 115 or output shaft 116 via rotational sensor 117. In some examples, transferring the torque from synchronizer 124 to second clutch plate 122 may include controlling the first magnetic field to increase the friction between synchronizer 124 and first clutch plate 120 until a rotational speed of second clutch plate 122 is within a threshold amount of a rotational speed of first clutch plate 120. For example, the threshold amount may include within about 1%, 5%, 10%, or 25% of the rotational speed of first clutch plate 120. In some examples, transferring the torque from synchronizer 124 to second clutch plate 122 may include controlling the first magnetic field to increase the friction between synchronizer 124 and first clutch plate 120 until a rotational speed of second clutch plate 122 is the same as or substantially similar to (e.g., within error of rotational sensors 115 and/or 117) a rotational speed of first clutch plate 120. In this way, the technique may include controlling, based on a rotation of at least one of first clutch plate 120 or second clutch plate 122, a magnetic field generated by electromagnet 107 to control an engagement of first clutch plate 120 with second clutch plate 122 via synchronizer 124.

The technique illustrated in FIG. 3 also may include controlling electromagnet 107 to generate a second magnetic field to cause first surface 134 of second clutch plate 122 to contact first surface 128 of first clutch plate 120 (306). For example, the technique may include controlling, by controller 110, a current applied to electromagnet 107 to generate a second magnetic field as a second magnetic flux passing through first clutch plate 120 and second clutch plate 122. The technique also may include, in response to the second magnetic field, translating synchronizer 124 in apertures 138 of second clutch plate 122 in the axial direction (e.g., toward second surface 136 of second clutch plate 122). In some examples, the technique may include, in response to the second magnetic field, closing air gap 150 between first clutch plate 120 and second clutch plate 122. In some examples, closing air gap 150 may include full engagement of first clutch plate 120 with second clutch plate 122.

In some examples, the technique may include determining, by rotational sensors 115 and/or 117, a rotational speed of at least one of first clutch plate 120 or second clutch plate 122. For example, controlling electromagnet 107 to generate the second magnetic field may include controlling, based on the determined rotational speed of at least one of first clutch plate 120 or second clutch plate 122, electromagnet 107 to generate the second magnetic field to cause first surface 134 of second clutch plate 122 to contact first clutch plate 120. As one example, once a rotation of first clutch plate 120 and second clutch plate 122 is substantially synchronized, e.g., a first rotational speed of first clutch plate 120 and a second rotational speed second clutch plate 122 are the same or within a predetermined threshold amount, electromagnet 107 may apply the second magnetic field to first clutch plate 120 and second clutch plate 122 to fully close air gap 150 between first clutch plate 120 and second clutch plate 122.

The following clause illustrate examples of the subject matter described herein.

Clause 1. An electromagnetic clutch assembly comprising: a first clutch plate configured to rotate about a clutch axis; and a second clutch plate configured to rotate about the clutch axis, the second clutch plate comprising: a first surface facing the first clutch plate; and a second surface facing away from the first clutch plate, wherein the second clutch plate defines an aperture extending from the first surface to the second surface, a synchronizer, wherein at least a portion of the synchronizer is configured to extend from the second surface of the second clutch plate through the aperture, wherein, in the absence of a magnetic field, the first clutch plate and the first surface of the second clutch plate define an air gap and the portion of the synchronizer extends through the aperture into the air gap, wherein, in response to a first magnetic field, a surface of the synchronizer is configured to contact the first clutch plate, and wherein, in response to a second magnetic field, the synchronizer is configured to translate in the aperture toward the second surface of the second clutch plate and the first clutch plate and the first surface of the second clutch plate are configured to close the air gap.

Clause 2. The electromagnetic clutch assembly of clause 1, wherein the aperture comprises a plurality of apertures, wherein the synchronizer comprises a plurality of synchronizers, each respective synchronizer configured to extend through a respective aperture of the plurality of apertures.

Clause 3. The electromagnetic clutch assembly of clause 1 or 2, wherein the synchronizer comprises an annular member configured to rotate about the clutch axis and at least one protrusion extending from the annular member substantially parallel to the clutch axis, and wherein the at least one protrusion extends from the second surface of the second clutch plate through the aperture.

Clause 4. The electromagnetic clutch assembly of clause 3, wherein the second surface of the second clutch plate defines an annular recess radially offset from the clutch axis, and wherein the annular recess of the second clutch plate is shaped to receive the annular member of the synchronizer.

Clause 5. The electromagnetic clutch assembly of any one of clauses 1 through 4, further comprising a spring configured to exert a force on the synchronizer in a direction toward the first clutch plate.

Clause 6. The electromagnetic clutch assembly of clause 5, wherein a first magnetic force of the first magnetic field is less than a spring force of the spring to close the air gap.

Clause 7. The electromagnetic clutch assembly of clause 5 or 6, wherein a second magnetic force of the second magnetic field is greater than a spring force of the spring to close the air gap.

Clause 8. The electromagnetic clutch assembly of any one of clauses 1 through 7, further comprising an electromagnet configured to:

generate the first magnetic field as a first magnetic flux passing through the first clutch plate and the second clutch plate, and generate the second magnetic field as a second magnetic flux passing through the first clutch plate and the second clutch plate.

Clause 9. The electromagnetic clutch assembly of clause 8, wherein the first clutch plate and the second clutch plate are configured to cause the magnetic flux to flux weave between the first clutch plate and the second clutch plate.

Clause 10. A system comprising: a first clutch plate configured to rotate about a clutch axis; a second clutch plate configured to rotate about the clutch axis, the second clutch plate defining an aperture extending substantially parallel to the clutch axis; a synchronizer configured to extend through the aperture toward the first clutch plate; a spring configured to exert a spring force on the synchronizer in a direction toward the first clutch plate, wherein the spring is configured to compress in response to the synchronizer translating in the aperture in the direction away from the first clutch plate; an electromagnet configured to: generate a first magnetic field as a first magnetic flux passing through the first clutch plate and the second clutch plate, wherein a first magnetic force of the first magnetic field is less than a spring force of the spring to close the air gap, and generate a second magnetic field as a second magnetic flux passing through the first clutch plate and the second clutch plate, wherein a second magnetic force of the second magnetic field is greater than a spring force of the spring to close the air gap; and processing circuitry configured to control a magnetic field generated by the electromagnet.

Clause 11. The system of clause 10, wherein, in the absence of a magnetic field, the first clutch plate and the first surface of the second clutch plate define the air gap and the synchronizer extends through the aperture into the air gap.

Clause 12. The system of clause 10 or 11, wherein, in response to the first magnetic field, the synchronizer is configured to contact the first clutch plate.

Clause 13. The system of any one of clause 10 through 12, wherein, in response to the second magnetic field, the synchronizer is configured to translate in the aperture toward the second clutch plate, and the first clutch plate and the second clutch plate are configured to close the air gap.

Clause 14. The system of any one of clause 10 through 13, wherein the processing circuitry is configured to, based at least in part on a rotational speed of the first clutch plate, cause the electromagnet to generate the second magnetic field.

Clause 15. The system of any one of clause 10 through 14, wherein the electromagnet is wound around the clutch axis.

Clause 16. The system of any one of clause 10 through 15, wherein at least a portion of the first clutch plate is disposed between the electromagnet and the second clutch plate.

Clause 17. The system of any one of clause 10 through 16, further comprising an input shaft configured to rotate the first clutch plate.

Clause 18. The system of clause 16, wherein the controller is configured to cause the electromagnet to generate the second magnetic flux based a rotational speed of the first clutch plate.

Clause 19. A method comprising: rotating a first clutch plate around a clutch axis; controlling an electromagnet to generate a first magnetic field to cause a synchronizer extending through an aperture of defined by a second clutch plate to contact the first clutch plate and generate a torque on the synchronizer, wherein the first clutch plate and the second clutch plate define an air gap; and controlling the electromagnet to generate a second magnetic field to cause the first surface of the second clutch plate to contact the first clutch plate.

Clause 20. The method of clause 19, wherein the method further comprises determining, by a rotational sensor, a rotational speed of at least one of the first clutch plate or the second clutch plate, wherein controlling the electromagnet to generate the second magnetic field comprises controlling, based on the determined rotational speed of at least one of the first clutch plate or the second clutch plate, the electromagnet to generate the second magnetic field to cause the first surface of the second clutch plate to contact the first clutch plate.

Various examples have been described. These and other examples are within the scope of the following claims.

What is claimed is:

1. A system, comprising:
   a first clutch plate configured to rotate about a clutch axis;
   a second clutch plate configured to rotate about the clutch axis, the second clutch plate defining at least one aperture extending substantially parallel to the clutch axis;
   at least one synchronizer configured to extend through the at least one aperture toward the first clutch plate;
   a spring configured to exert a spring force on the synchronizer in a direction toward the first clutch plate, wherein the spring is configured to compress in response to the synchronizer translating in the at least one aperture in the direction away from the first clutch plate;
   an electromagnet configured to:
      generate a first magnetic field as a first magnetic flux passing through the first clutch plate and the second clutch plate, wherein a first magnetic force of the first magnetic field is less than a spring force of the spring to close an air gap, and
      generate a second magnetic field as a second magnetic flux passing through the first clutch plate and the second clutch plate, wherein a second magnetic force of the second magnetic field is greater than the spring force of the spring to close the air gap; and
   processing circuitry configured to control a magnetic field generated by the electromagnet.

2. The system of claim 1, wherein, in the absence of the magnetic field, the first clutch plate and the first surface of the second clutch plate define the air gap and the at least one synchronizer extends through the at least one aperture into the air gap.

3. The system of claim 1, wherein, in response to the first magnetic field, the at least one synchronizer is configured to contact the first clutch plate.

4. The system of claim 1, wherein, in response to the second magnetic field, the at least one synchronizer is configured to translate in the at least one aperture toward the second clutch plate, and the first clutch plate and the second clutch plate are configured to close the air gap.

5. The system of claim 1, wherein the processing circuitry is configured to, based at least in part on a rotational speed of the first clutch plate, cause the electromagnet to generate the second magnetic field.

6. The system of claim 1, wherein the electromagnet is wound around the clutch axis.

7. The system of claim 1, wherein at least a portion of the first clutch plate is disposed between the electromagnet and the second clutch plate.

8. The system of claim 1, further comprising an input shaft configured to rotate the first clutch plate.

9. The system of claim 7, wherein a controller is configured to cause the electromagnet to generate the second magnetic flux based a rotational speed of the first clutch plate.

10. The system of claim 1, wherein the at least one aperture comprises a plurality of apertures, wherein the at least one synchronizer comprises a plurality of synchronizers, each respective synchronizer configured to extend through a respective aperture of the plurality of apertures.

11. The system of claim 1, wherein the synchronizer comprises an annular member configured to rotate about the clutch axis and at least one protrusion extending from the annular member substantially parallel to the clutch axis, and wherein the at least one protrusion extends from the second surface of the second clutch plate through the at least one aperture.

12. The system of claim 11, wherein the second surface of the second clutch plate defines an annular recess radially offset from the clutch axis, and wherein the annular recess of the second clutch plate is shaped to receive the annular member of the synchronizer.

13. The system of claim 1, wherein the first clutch plate and the second clutch plate are configured to cause the first magnetic flux and the second magnetic flux to flux weave between the first clutch plate and the second clutch plate.

14. The system of claim 1, further comprising at least one rotational sensor that determines a rotational speed of at least one of the first clutch plate or the second clutch plate, and, based on the rotational speed determined by the at least one rotational sensor, the processing circuitry controls the electromagnet to generate the second magnetic field to cause the second clutch plate to contact the first clutch plate.

15. A system, comprising:
at least one input shaft;
at least one output shaft; and
an electromagnetic clutch assembly between the at least one input shaft and the at least one output shaft, wherein the electromagnetic clutch assembly comprises:
a first clutch plate coupled to the at least one input shaft, wherein the first clutch plate is configured to rotate about a clutch axis;
a second clutch plate coupled to the at least one output shaft, wherein the second clutch plate is configured to rotate about the clutch axis, the second clutch plate defining at least one aperture extending substantially parallel to the clutch axis;
at least one synchronizer configured to extend through the at least one aperture toward the first clutch plate;
a spring configured to exert a spring force on the synchronizer in a direction toward the first clutch plate, wherein the spring is configured to compress in response to the synchronizer translating in the at least one aperture in the direction away from the first clutch plate;
an electromagnet configured to:
generate a first magnetic field as a first magnetic flux passing through the first clutch plate and the second clutch plate, wherein a first magnetic force of the first magnetic field is less than a spring force of the spring to close the air gap, and
generate a second magnetic field as a second magnetic flux passing through the first clutch plate and the second clutch plate, wherein a second magnetic force of the second magnetic field is greater than a spring force of the spring to close the air gap; and
processing circuitry configured to control a magnetic field generated by the electromagnet.

16. The system of claim 15, wherein the input shaft is coupled to a drive shaft of a gas turbine engine.

17. The system of claim 16, wherein the output shaft is coupled to an accessory for the gas turbine engine, wherein the accessory is chosen from one or more fuel pumps, generators, constant speed drives, oil pumps, hydraulic pumps, compressors, engine starters, tachometer sensor drives, and auxiliary gearbox drives.

18. The system of claim 15, further comprising at least one rotational sensor that determines a rotational speed of at least one of the first clutch plate or the second clutch plate, and, based on the rotational speed determined by the at least one rotational sensor, the processing circuitry controls the electromagnet to generate the second magnetic field to cause the second clutch plate to contact the first clutch plate.

* * * * *